(12) United States Patent
Rotem

(10) Patent No.: US 6,570,493 B1
(45) Date of Patent: May 27, 2003

(54) METHOD AND APPARATUS FOR OPERATING AN ELECTRICAL DEVICE

(75) Inventor: Barak Rotem, Kfar Vradim (IL)

(73) Assignees: Eliahu Lames, Haifa (IR); Ori Rotem, Nahiriya (IR); Andre Lamash, Haifa (IR)

( * ) Notice: Subject to any disclaimer, the term of this patent is extended or adjusted under 35 U.S.C. 154(b) by 0 days.

(21) Appl. No.: 09/563,360

(22) Filed: May 3, 2000

(51) Int. Cl.[7] .............................................. H04M 11/04
(52) U.S. Cl. ........................... 340/310.01; 340/310.02; 340/310.03; 340/310.06
(58) Field of Search ....................... 340/310.01, 310.02, 340/310.03, 310.06; 375/259

(56) References Cited

U.S. PATENT DOCUMENTS

| | | | | |
|---|---|---|---|---|
| 4,222,035 A | | 9/1980 | Lohoff | 340/310.02 |
| 4,310,829 A | | 1/1982 | Rey | 108/51.11 |
| 4,392,125 A | * | 7/1983 | Iwata | 340/518 |
| 4,418,333 A | * | 11/1983 | Schwarzbach et al. | 340/310.01 |
| 4,719,446 A | | 1/1988 | Hart | 340/310.01 |
| 4,990,908 A | * | 2/1991 | Tung | 340/310.01 |
| 5,257,006 A | * | 10/1993 | Graham et al. | 340/310.01 |
| 5,365,154 A | * | 11/1994 | Schneider et al. | 340/310.01 |
| 5,493,267 A | | 2/1996 | Ahlse et al. | 340/310.02 |
| 5,805,052 A | * | 9/1998 | Hansemann et al. | 340/310.01 |
| 5,920,253 A | | 7/1999 | Laine | 340/310.01 |
| 5,923,271 A | | 7/1999 | Santini | 340/3.1 |
| 5,929,749 A | | 7/1999 | Slonim et al. | 340/310.01 |

* cited by examiner

Primary Examiner—Donnie L. Crosland
(74) Attorney, Agent, or Firm—Mark M. Friedman

(57) ABSTRACT

A method and apparatus for communication of information along electric power lines. Control messages are generated and transferred between a switch and an associated load coupled by an electric conductor power line. The method includes modifying at least a portion of the shape of an electric power wave, by cutting at least a portion of the wave supplied on the electrical conductor, without adversely affecting operation of the load.

28 Claims, 11 Drawing Sheets

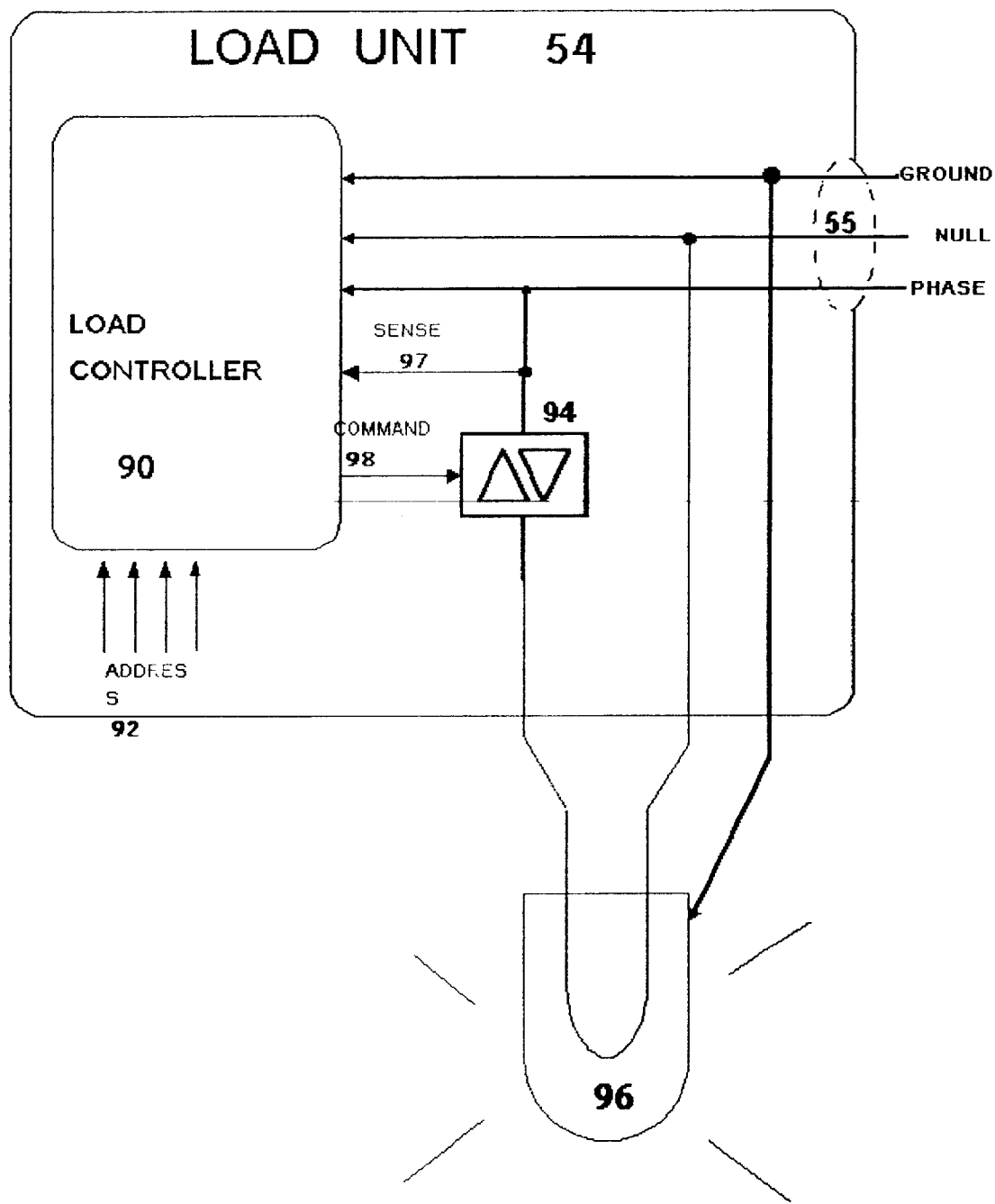
Fig: 5

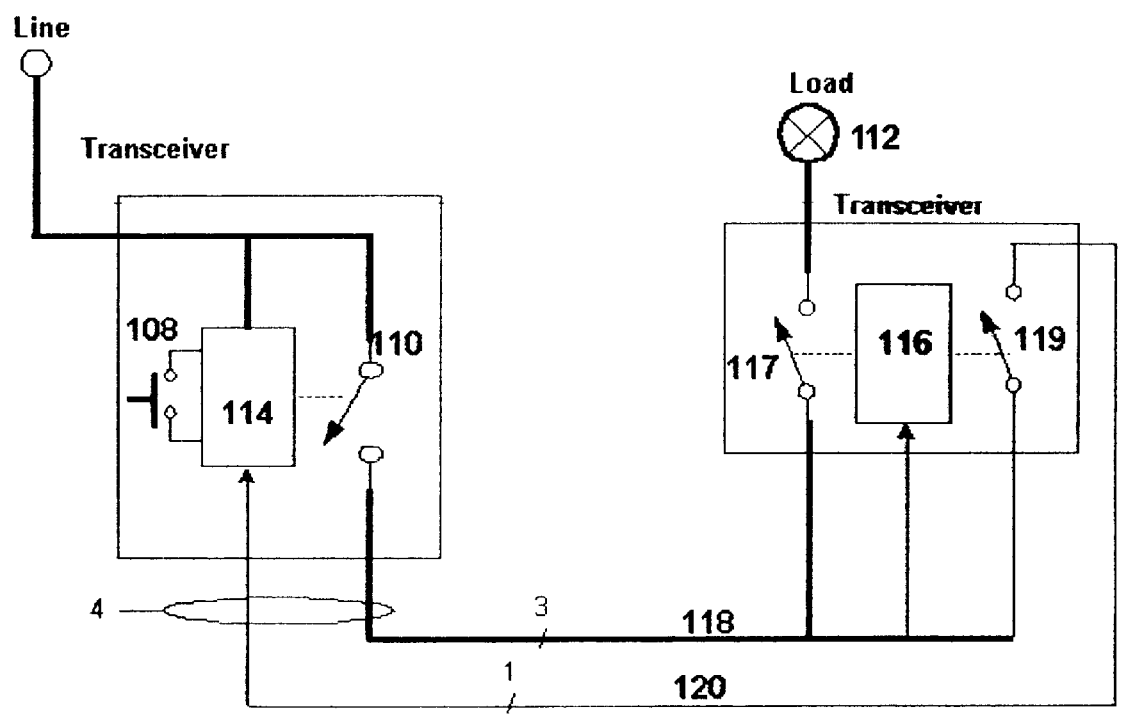
Fig: 7

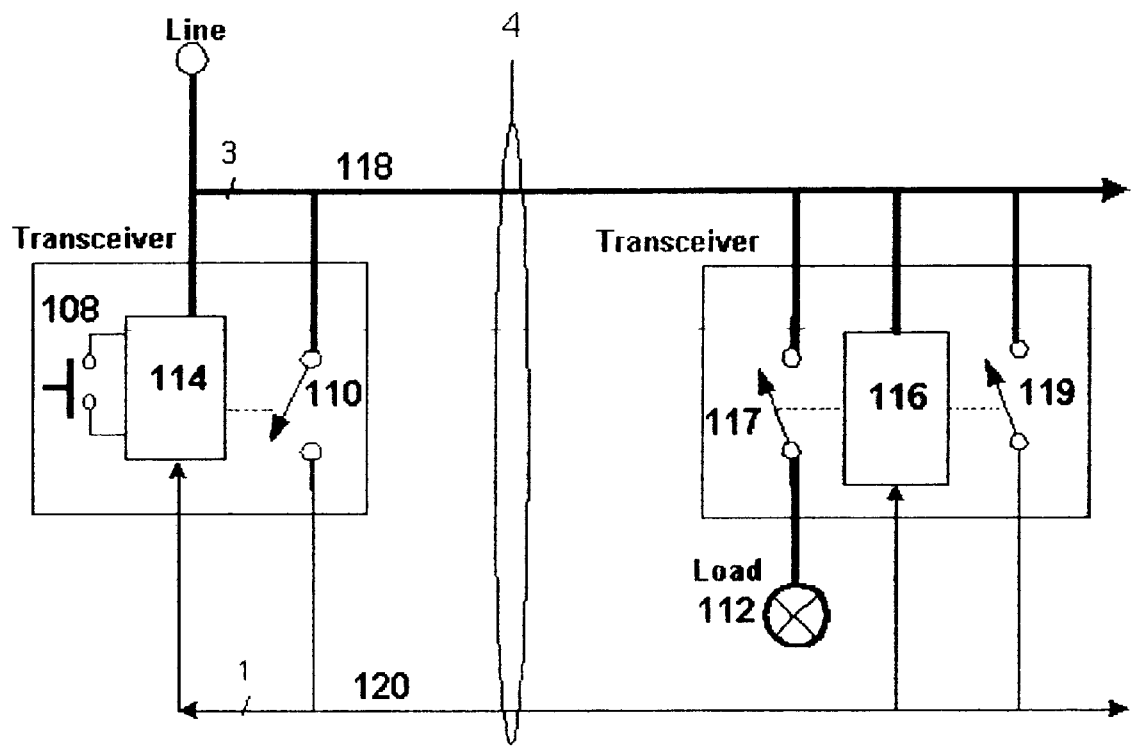
Fig: 7a

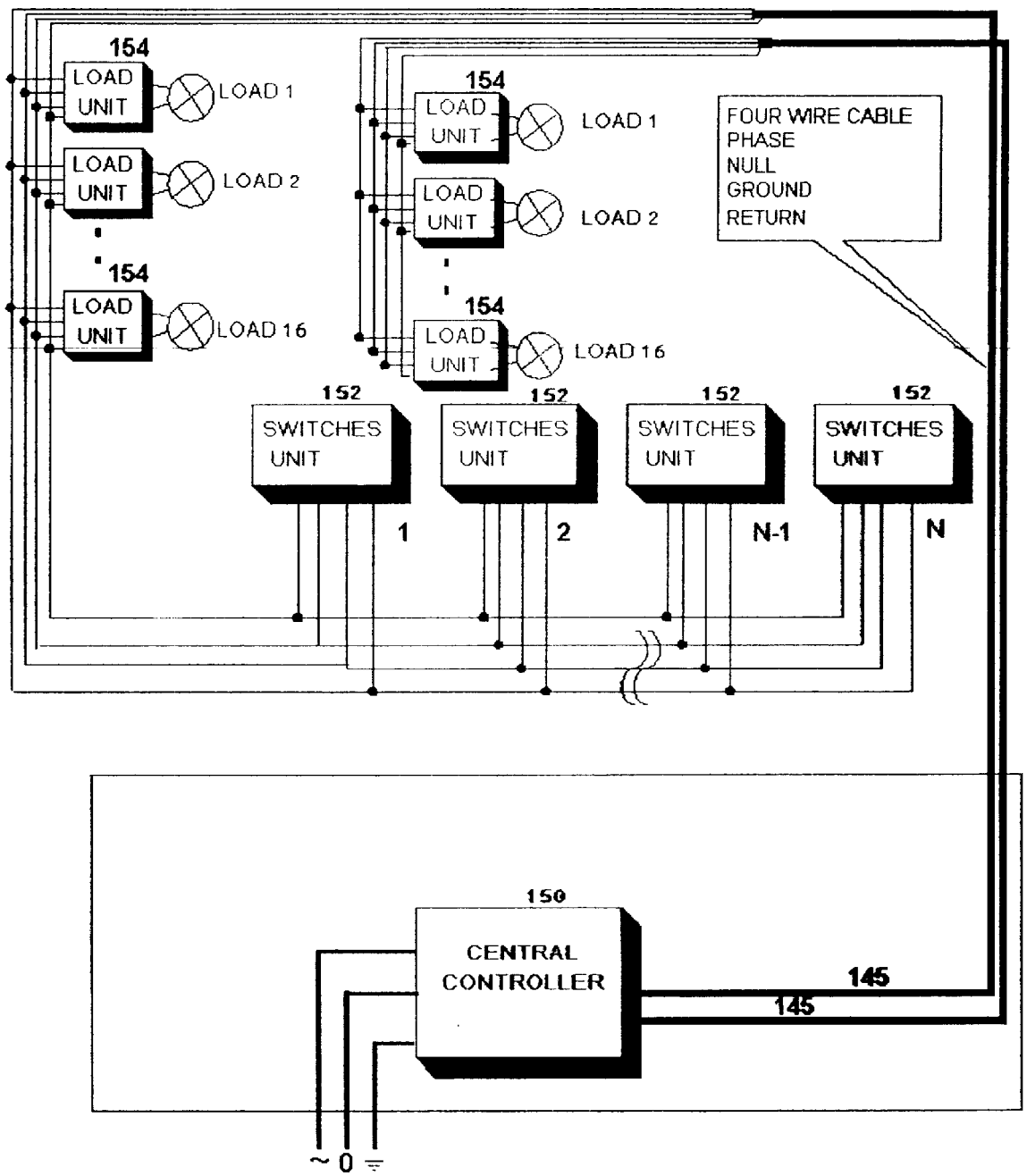
Fig: 8

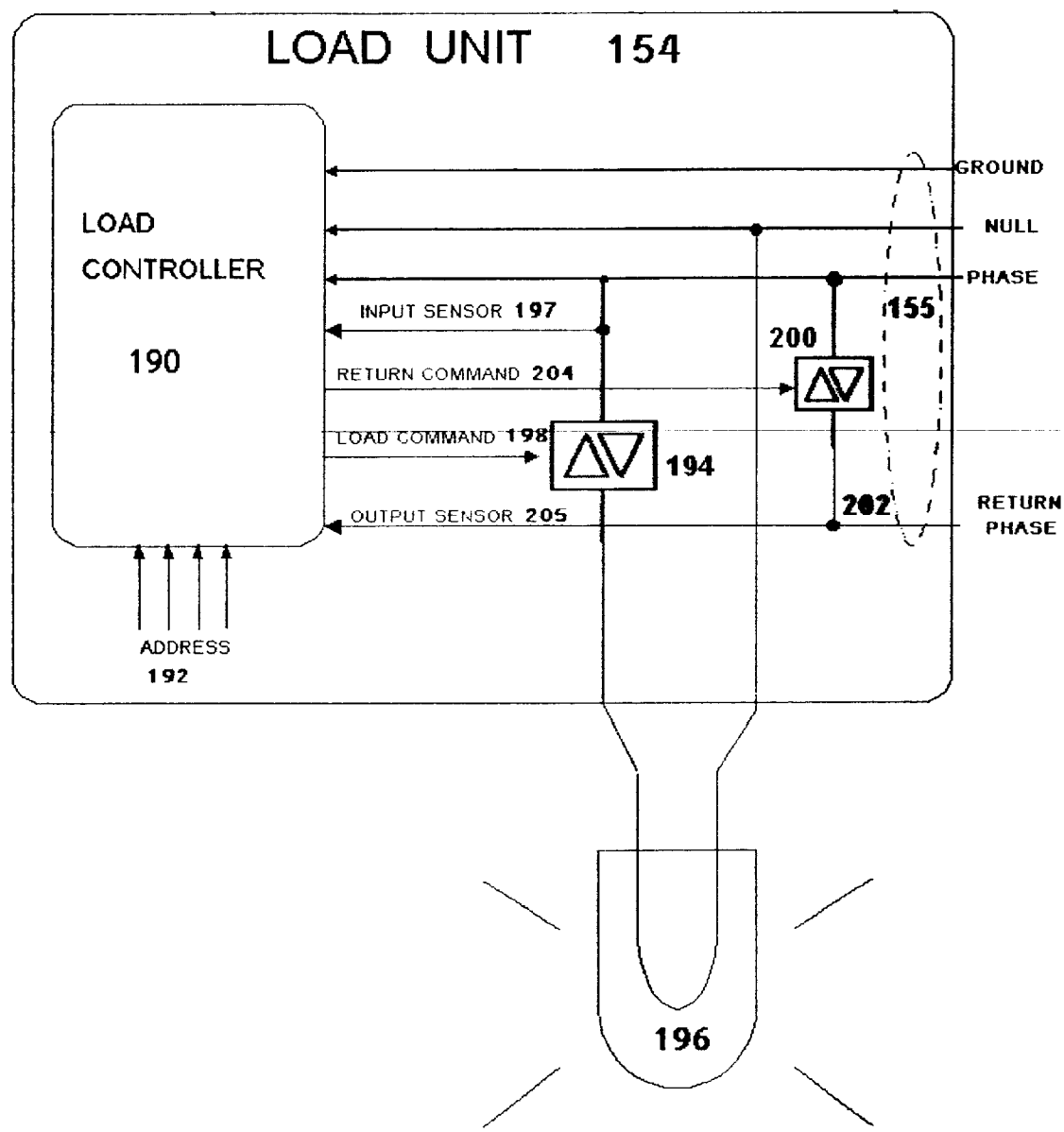
Fig: 10

METHOD AND APPARATUS FOR OPERATING AN ELECTRICAL DEVICE

FIELD OF THE INVENTION

The present invention relates to a method and apparatus for communication between an electrical device and a switch for operating the device in general, and more particularly to communication means for centrally controlling the operation of a plurality of electrically operated devices.

BACKGROUND OF THE INVENTION

Devices for transmitting data to and from an electrical device for activating or turning off the device are known in the art. These generally include a separate communication line laid between the device and the switch, or other means of activating the device.

Most of the conventional means for centrally controlling the operation of electrically operated devices can be divided into two groups:

control means utilizing an extra set of electrical conductors, or control lines, for each device, for the transmission of a control signal from the control means, such as a switch, to the controlled device or to its switching means.

control means employing electromagnetic radiation such as radio frequency (RF), or infra-red (IR), for the transmission of control signals from the control means to the controlled device or to its switching means.

These conventional control means suffer from several drawbacks. The use of special control lines for the transmission of control signals to each controlled device is cumbersome, and necessitates expensive laying of the control lines. Furthermore, changes in the location or of the type of a controlled device usually necessitate re-laying of its control lines.

IR transmission requires a line of sight transmission between the location of the device generating the control signal and the controlled device.

RF transmission, while not requiring line of sight between the control means and the controlled device, is often undesirable because the RF radiation is known, at times, to reach and actuate other devices, perhaps located elsewhere, in addition to actuating the intended one. Also, RF radiation is often blocked by metallic objects and therefore RF signal communication between the control means and the controlled device is not guaranteed.

It is also known to add signals to an existing wave on a power line. Communications data are modulated onto the electric wave. This method is complicated, requires additional circuitry and suffers from the same drawbacks as the RF transmission.

The following prior art patents provide control signals over an existing wave of a power line, but all suffer from deficiencies that make them inefficent or inappropriate: U.S. Pat. No. 4,719,446 to Hart; U.S. Pat. No. 4,222,035 to Lohoff; U.S. Pat. No. 5,493,267 to Ahlse et al; and U.S. Pat. No. 5,923,271 to Santini.

It is therefore desirable to provide means for controlling the operation of electrical devices that do not suffer from the aforementioned drawbacks.

SUMMARY OF THE INVENTION

According to the present invention, tie is provided a method and apparatus for communication of information along electrical conductors of electric power lines in general, and more particularly, means of communication between a central controller and a plurality of electrical devices.

There is thus provided in accordance with the invention, a method for generating and transferring control messages between a switch and an associated load coupled by an electric conductor power line, the method including modifying at least a portion of the shape of an electric power wave supplied on the electric conductor, without adversely affecting operation of the load.

According to one embodiment of the invention, the step of modifying the shape of an electric wave includes cutting at least a portion of the electric power wave supplied to the load.

According to another embodiment of the invention, the step of modifying the shape of an electric wave includes cutting at least one complete half-wave of the electric power wave supplied to the load.

According to a preferred embodiment the method further includes coupling a load controller between the conductor and the load, receiving the control messages in the load controller, and activating the load in accordance with the messages received.

Further according to a preferred embodiment, the method further includes coupling a central controller between the switch and the load controller, receiving control messages indicating a change of state from the switch in the central controller, and supplying control messages by modifying at least a portion of an electric power wave over the electric conductor to the load controller, in accordance with the messages indicating a change of state.

There is also provided in accordance with the present invention an apparatus for transferring command messages to a load including a controller for modifying an electric power wave supplied to the load on an electrical conductor of an electric power line.

According to a preferred embodiment of the invention, the means for modifying includes means for cutting at least a portion of the electric power wave.

BRIEF DESCRIPTION OF THE DRAWINGS

The present invention will be understood and appreciated more fully from the following detailed description, taken in conjunction with the drawings, in which:

FIG. 5 is a detailed schematic illustration of a load unit in the system of FIG. 2;

FIG. 7 and 7a is a schematic illustration of a communication system constructed and operative in accordance with another embodiment of the present invention;

FIG. 8 is a schematic illustration of a communication system constructed and operative for controlling a plurality of loads using a 4 wire cable;

FIG. 10 is a detailed schematic illustration of a load unit in the system of FIG. 8.

DETAILED DESCRIPTION OF THE INVENTION

The present invention relates to a method and apparatus for the generation, transmission, reception, and processing of electrical command signals and messages along a current path between a switch and an electrically operated device, herein called a load. This is accomplished by modifying the normal shape of the electric power wave supplied over the electrical conductor power line to or from the load controller in such a way that the changed shape can be utilized to convey command messages, but without adversely affecting the operation or the structure of the load. This method of communication is useful in a network having an alternating current (AC) common power source and a plurality of power lines emanating from the source, conducting power to a plurality of loads, so as to control and monitor the operation of the loads. Such a network may be domestic, commercial, industrial or any other, and could be single phase or three phase, of delta or triangle connection. Such a network is particularly useful to provide means of communication between switches and their loads for centrally controlling the operation of the loads.

Figure 1:
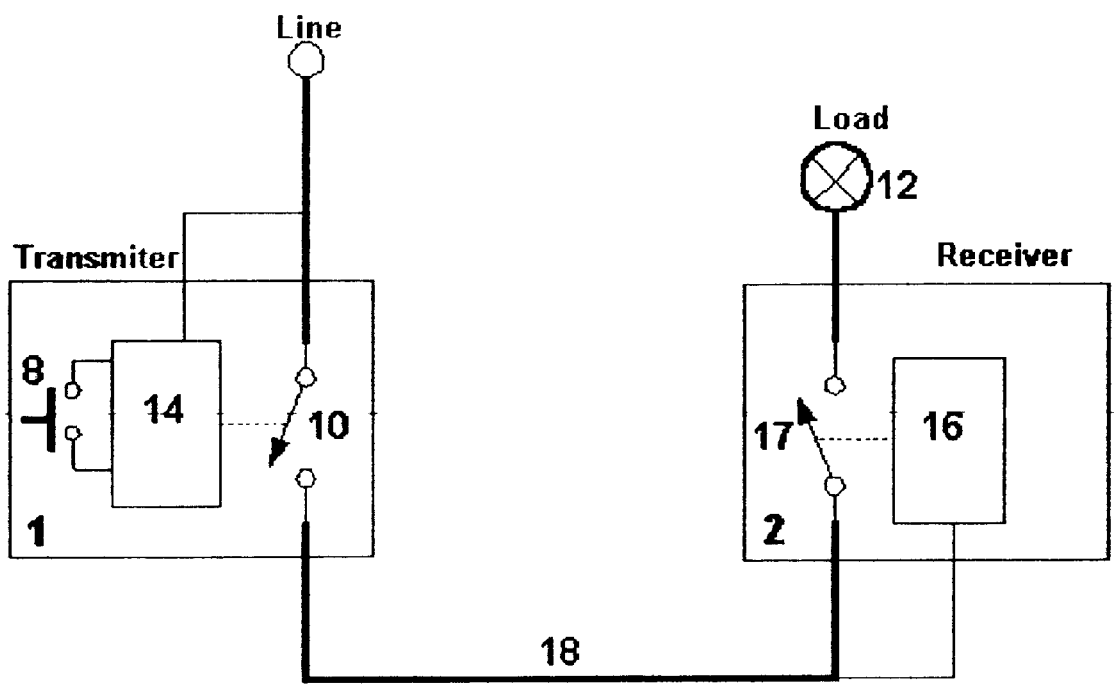
FIG. 1 is a schematic illustration of a communication system constructed and operative in accordance with one embodiment of the present invention.

Referring now to FIG. 1, there is shown a schematic illustration of a communication system constructed and operative in accordance with one embodiment of the present invention including a switch 8 and an electrical device or load 12. For purposes of the present invention, load 12 can be any electrically operated device whose operation is not adversely affected by a brief interruption of voltage supplied to the load, including, but not limited to, lights, heaters, alarms, water sprinklers, and so on.

According to the invention, switch 8 includes a switch controller 14 capable of modifying the shape of the mains electric power wave conducted to load 12, by means of a triac, or other power electrical switch 10. Thus, a change the state of switch 8 is sensed by switch controller 14, which can modify the shape of the mains electric power wave conducted to load 12 in accordance with an indicated change in state. As will be described below, modifying the shape of the wave can include cutting a portion of the wave, or cutting a whole pulse of a power wave. It will be appreciated that, for purposes of the present invention, cutting a portion of a wave means briefly interrupting the current flow along a line through which current normally flows. Alternatively, modifying the shape of the wave can include providing a pulse on a line normally without current flow.

Load 12 includes a load controller 16, coupled via the power line 18 to transmitter 1, which receives the electric power waves from transmitter 1. Load controller 16 identifies any messages sent over the power line and reads the messages in order to determine if or how to change the state of load 12, as by means of a triac 17. Changes of state can include, for example, turning on or off the electrical device, dimming a light, activating a solenoid to open a sprinkler line, and so forth.

Operation of this embodiment is as follows. When it is desired to change the state of load 12, switch 8 is actuated. Switch controller 14 senses the actuation of switch 8, and activates electronic power switch 10 to modify the electric power wave conducted along power line 18 so as to include a command message regarding the desired change of state.

The modified wave is received by load controller 16 which identifies the fact that the wave has been modified. It then decodes the command message in the modified wave, and performs the required operation on load 12.

One system in which the communication method of this embodiment of the invention is particularly useful is a water heater having a boiler located at a location remote from its control unit. In addition, any other system having a control unit located at a distance from a load and coupled thereto by a power line can benefit from the present invention.

Figure 2:
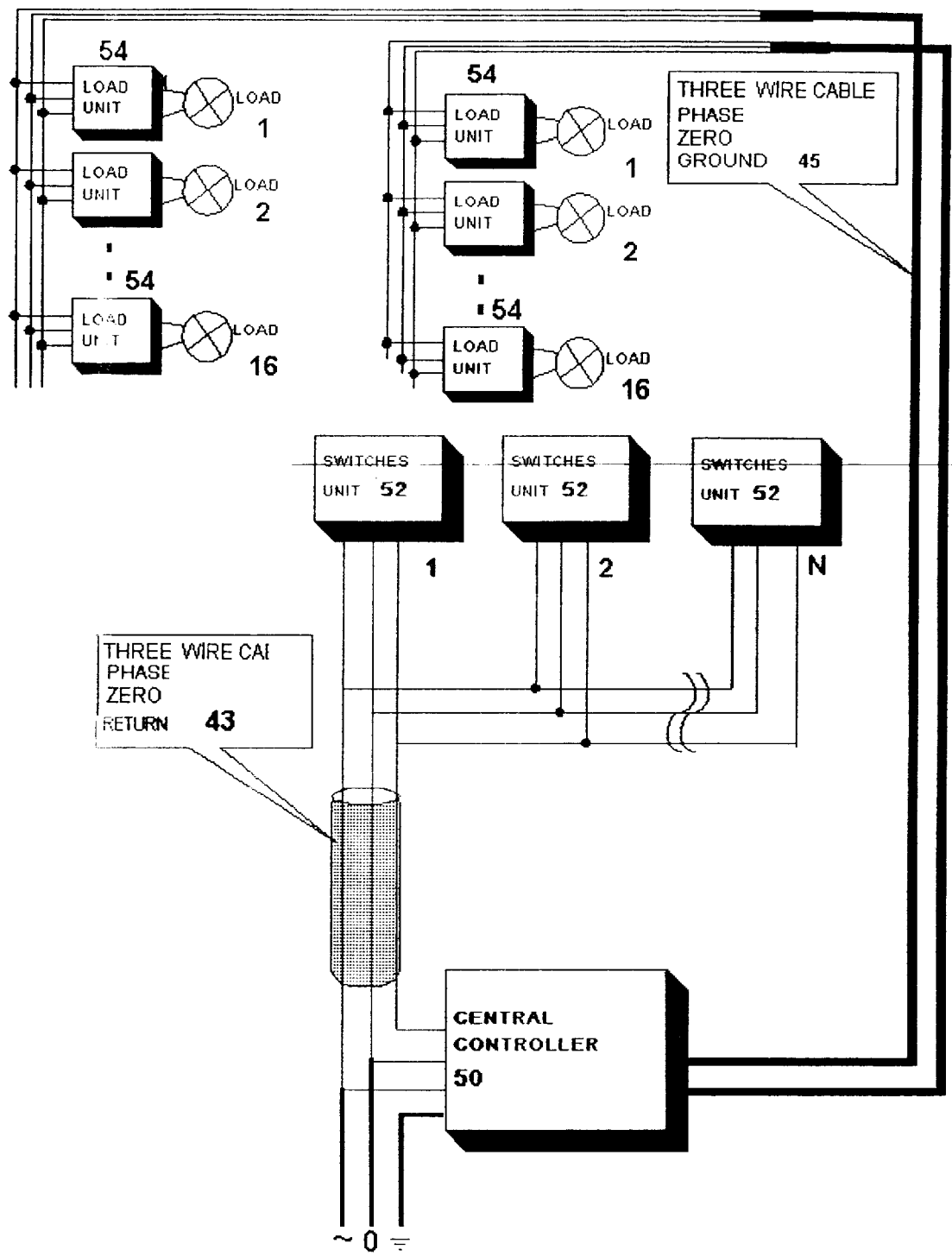
FIG. 2 is a schematic illustration of a communication system constructed and operative in accordance with yet another embodiment of the present invention, for controlling a plurality of loads.

Referring now to FIG. 2, there is shown a schematic illustration of a communication system constructed and operative in accordance with another embodiment of the present invention, for controlling a plurality of loads. The system includes a central controller 50, a plurality of switch units 52 coupled to an inlet port of the central controller 50, and a plurality of load units 54, here illustrated as lamp units, although the loads can be any other electrical device, as discussed hereinabove. In the embodiment of FIG. 2, all the switch units 52 are connected to the central controller 50 via a single three wire cable 43, i.e., phase, zero, and return phase. Switch units 52 are connected to central controller 50 in parallel, or in any other form of connection, including, but not limited to, star, parallel or in line. There is no limit to the number of units or switches.

Load units 54 are connected to an output of central controller 50 in parallel by a three wire cable 45, namely phase, zero, and ground. Alternatively, the load units can be connected to the central controller in any other form of connection.

The central controller may be located in the main electric box, or in any other suitable location in the facility, house or room. Central controller 50 receives messages from the switches in switch units 52 over power line 43, and modifies the electric power wave as required to send command messages to load units 54. It is a particular feature of this embodiment of the present invention that the switches are not connected directly by a cable to the load units they activate. Rather, central controller 50 processes messages from the switches indicating the desired state of a load, determines to which load units they relate, and provides messages to the load units to change their state, as indicated by the switches.

Figure 3:
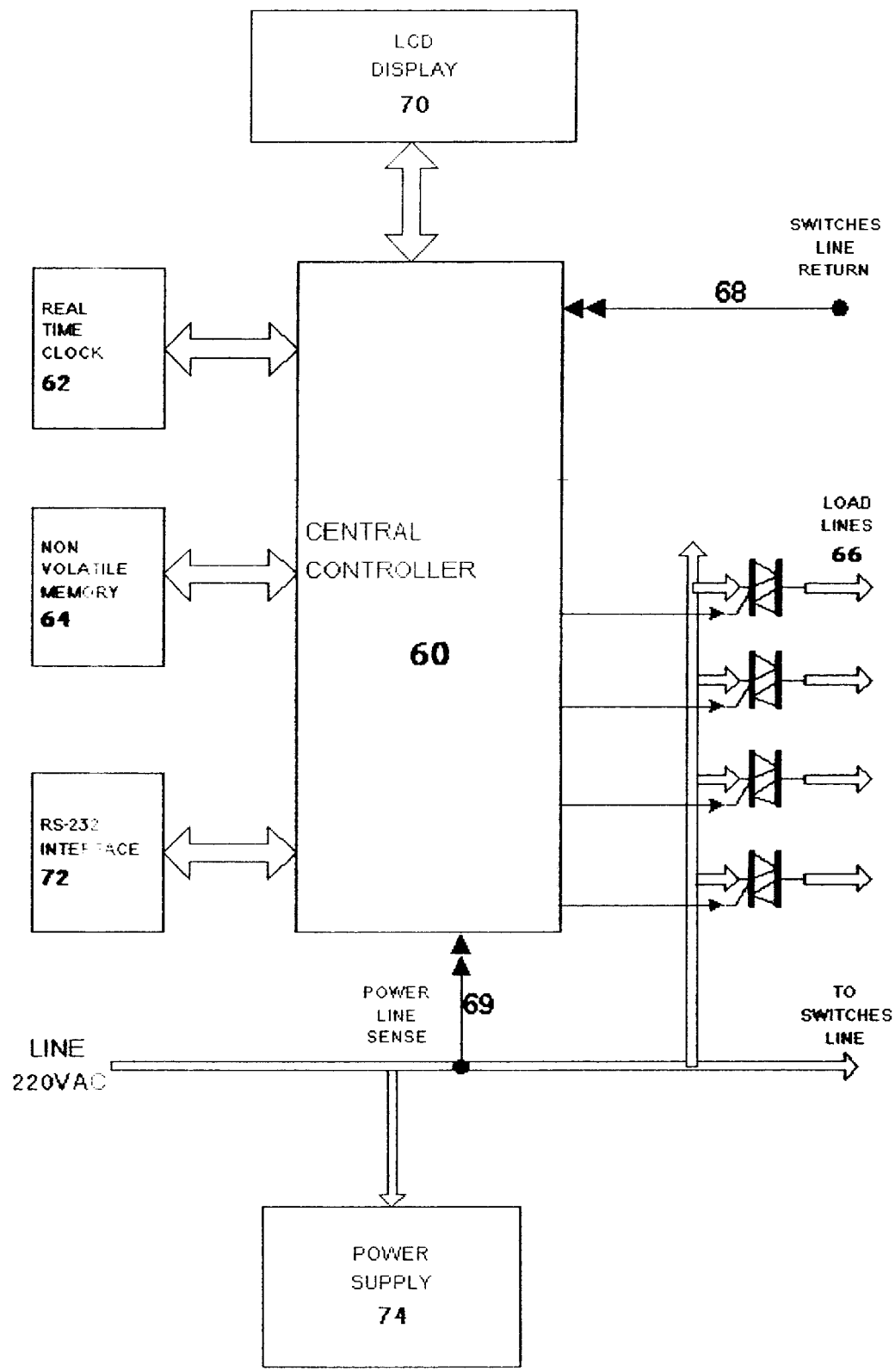
FIG. 3 is a detailed schematic illustration of a central controller unit in the system of FIG. 2.

FIG. 3 is a detailed schematic illustration of a central controller unit in the system of FIG. 2. Central controller 50 includes the following components: a micro-controller 60 including 2 A/D converters 68 and 69, which are used as sampling circuits for the switches return line and for the network power line, respectively, and several input/output channels. Microcontroller 60 is coupled to a non-volatile, real time clock 62 that provides date and time signals to the micro-controller, and to a non-volatile in-line memory 64 for the storage of the system, in case of a power-off situation. Microcontroller 60 is also coupled to switching circuits 65 (for example triacs) for switching of the load lines, and to a power supply 74. It can also be coupled to an LCD and keyboard or other display 70 for a user interface, and/or to an interface 72 for an RS232 line for communication with an external computer.

The central controller 50 controls all of the activities of the system. According to a preferred embodiment of the invention, the controller program bases its activities on three tables stored in the non-volatile memory, whose contents could be read and updated in the course of work. The first is a loads table, in which the last state of each load is registered (i.e., the last command sent to it). This table saves the state of the loads in case of power interruption, and for current work for changing the previous state. The central controller updates the table every time that it sends a message to one of the loads. At the time of power on, the controller reads the table and sends to each load controller an operating command in accordance with the listing in the table.

The second is a connections table, where all the connections between each of the switches and each of the loads are entered. There can be more than one connection to each switch, that is, the switch can control simultaneously a number of loads, and there could be more than one connection for each load, i.e., a load controlled by a number of switches. The table size varies and depends on the number of connections defined in the system.

It is a particular feature of the invention that the connections table can easily be modified. In this way, it is easy to change connections between various switches and various loads, without requiring re-wiring of the building, which is impossible in conventional systems.

The third table is a timing table, which includes the connection between time/date values and the addresses of the loads, in order to permit their activation by the time clock, in addition to, or instead of, activation by a switch. In other words, it contains the time at which selected loads are to be turned on, off, or otherwise activated, or bulbs dimmed, according to the system operator's requirements. In this table, too, there could be a number of connections to each one of the loads.

Operation of these tables is described in detail hereinbelow.

Figure 4:
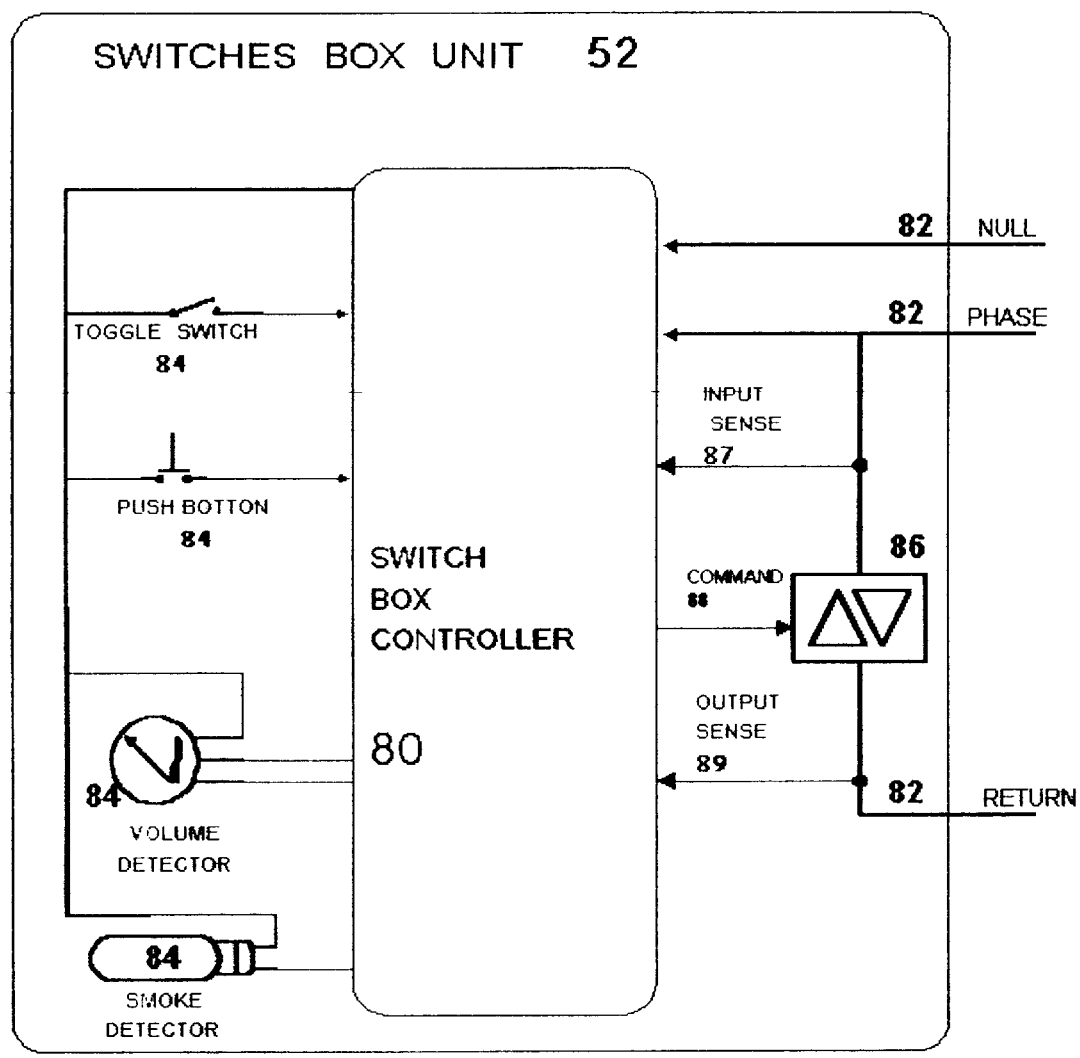
FIG. 4 is a detailed schematic illustration of a switch unit in the system of FIG. 2.

FIG. 4 is a detailed schematic illustration of a switch unit 52 in the system of FIG. 2. Each switch unit 52 includes a switch controller 80 connected to a switch line 82 including three conductors. At least one switch 84 is coupled to each switch controller 80. In the embodiment illustrated in FIG. 4, four switches are coupled to the switch controller—a toggle switch, a momentary push button, a detector for an alarm system, and a smoke detector. Each switch unit 52 and each switch 84 in the unit has an address. Thus, control commands concerning a particular switch will identify their source by the switch unit address and the switch address within the unit. Accordingly, it will be appreciated that the number of switches which can be coupled to a single switch controller depends on the number of bits available for the switch unit and switch addresses. For example, if the message includes 12 bits of information, including synchronization, then 6 bits can be used to indicate the switch unit address, making a total of 64 units which can be connected to the central controller, and 4 bits can be used to indicate the switch address, making a total of 16 switches in each unit, with one bit remaining to indicate switch status.

Switch controller 80 checks the switches in its unit, and looks for changes in their state relative to the state in the previous check. When the power is turned on in the system, the switch controller reads the states of all of the switches in the unit, and saves them for comparison purposes. At predetermined time intervals thereafter, the switch controller sequentially reads the state of each switch. When the controller identifies a change in one of the switches, it generates an appropriate message by adding pulses of the electric power wave to the return line, which normally has zero voltage, and is supplied to the central controller. The message includes the address of the unit, the address of the changed switch, and the nature of the change, namely the new state.

An electronic power switch 86, such as a triac, or other means of adding pulses of the electric wave, is coupled between the phase and return line of the power line. An input sensor 87 senses the input to switch controller 80, a command line 88 conducts commands from switch controller 80 to triac 86, and an output sensor 89 senses the outgoing voltage on the return line.

FIG. 5 is a detailed schematic illustration of a load unit 54 in the system of FIG. 2. Each load unit 54 includes a load controller 90 connected to the three-wire load line 55. Load controller 90 checks the power line, and looks for messages destined for that load unit. For example, the controller can be given four address lines 92, whose connection to voltage and to ground during the system installation permits the load unit to be given one of 16 addresses. Load controller 90 receives all the messages on the line, and compares its own address to the address portion of the message. When it identifies a message destined for its load, it decodes the message and determines the action to be taken, for example, turn on, off, or dim the load.

A triac 94, or other electronic power switching means, is coupled between the load controller 90 and the load 96. An input sensor 97 senses the input to load controller 90, and a command line 98 sends commands from load controller 90 to triac 94.

Operation of the system of the present invention is as follows.

When the system is first turned on, the central controller sends turning off instructions to all of the loads. The load units do not contain any memory for storage of their last state before the electricity was turned off, so when the electricity returns, they are in an off state. The central controller then reconstructs, from a non-volatile memory, the state of all the loads, and activates them accordingly.

The switch units do not have any memory, either, and when the system is first turned on, the switch controller in each switch unit writes for itself its address (read from the hardware), and the state of the switch. Once the state of a switch changes, the local controller in the switch unit identifies the change, and sends a message by modifying the state of the return line supplied to the central controller. During normal operation of the system, the central controller waits for messages about the change of state of any of the switches. At the same time, the central controller periodically checks the time and, independently, activates various loads according to a time schedule, as discussed in detail below, without regard to the manual change of a switch.

When a message comes from one of the switch units about a change of state of one of the switches, the central controller takes from the non-volatile memory the activity that the specific switch controls, for example, the number of the load that has to be turned on, the controller identifies from the message the kind of activity that should be done, such as turn on, turn off, dim, etc., and sends to the load unit a command message to perform this command by modifying the electric power wave supplied to the load unit.

It is a particular feature of the present invention that messages from the switch units and messages for the load units are sent over the three-wire power lines, by modifying the shape of the electric power wave (i.e., causing brief interruptions of power) supplied on the electric conductor from the switch unit to the central controller, and by modifying the shape of the electric power wave from the central controller to the load controller. In this way, no separate communication lines are required between the switches and the loads.

Figure 6A:
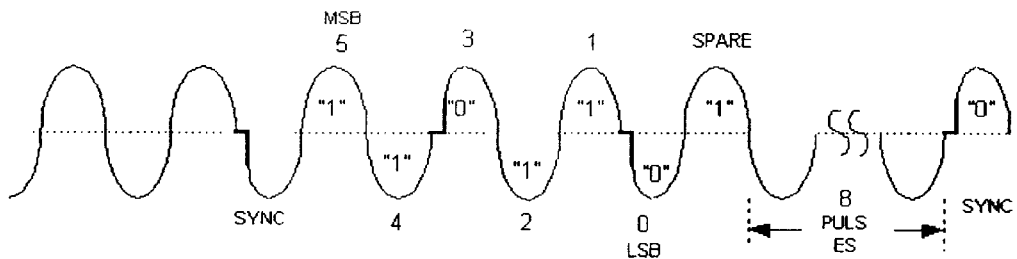
FIGS. 6a, 6b and 6c are schematic illustrations of ways to generate messages on a power line.
Figure 6B:
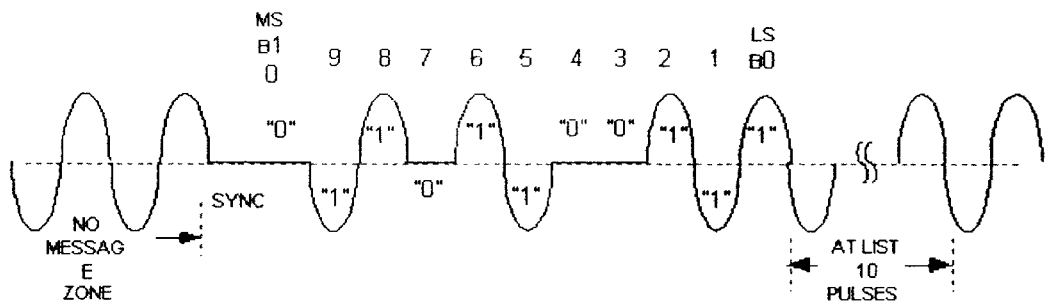
Figure 6C:
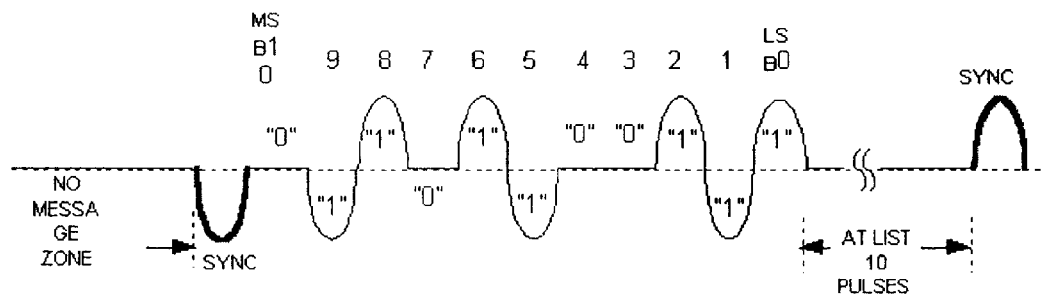

FIGS. 6a, 6b and 6c are schematic illustrations of preferred ways to generate messages on a power line. The method illustrated in FIG. 6a includes cutting a small portion of some of the pulses of the electric power, such as, for example, a 1 millisecond delay. This can be accomplished by a Triode AC switch, known as a triac, or other electronic power switch. In this way, a cut or modified pulse can represent '0' logic, while an uncut or unmodified pulse can represent '1' logic, or vice versa. This method is particularly suitable for sending messages from the central controller to the load units, since it is the least likely to adversely affect the operation of the load. In the illustrated non-limiting example, the message consists of 8 pulses, representing 8 bits. The first pulse is a cut pulse for synchronization, informing the load controller that the following 7 pulses contain information, here, shown as from the most significant bit (MSB) to the least significant bit (LSB). The information is represented by both the positive and negative half waves. At least 8 full pulses, uncut, must pass between transmission of two messages to permit re-synchronization (since, in this example, a message must contain at least one cut pulse in 8 pulses).

In this example, the first two pulses or bits represent the operation to be carried out, i.e., turn off, turn on, dimmer stronger, dimmer weaker, or any other desired operation. The next four pulses or signals represent the address of the load unit to which the message is addressed, and a '0' is transferred at the end of the message. It will be appreciated that each load will have a different address. If a number of load wires are utilized, two loads on different cables can have the same address.

Alternatively, for loads whose operation is not affected by interruptions in voltage, instead of cutting a small portion of the pulse, an entire pulse (i.e., the positive or negative half-wave) can be cut to indicate '0' logic or '1' logic. This possibility is indicated in FIG. 6b.

It will be appreciated that the particular method chosen depends on the load. For example, for a light, an entire pulse cannot be cut, since the light will flash. On the other hand, a device such as a heater will not be affected by the cutting of an entire pulse. It will also be appreciated that this method of communication does not permit the transferal of large quantities of data or fast rate of transmission. However, the small amount of data available is sufficient for purposes of controlling operation of electric devices.

Messages can be sent on the switches return line as indicated in FIG. 6c. The return switch line is normally without any voltage, and command messages are transferred by sending pulses along the line. In the non-limiting example of FIG. 6c, no pulse represents '0' logic, and half a wave represents '1' logic. The message is transferred on both positive and negative half-waves. In the illustrated example, the message is 12 bits long. The beginning is marked by a synchronizing pulse—a half-wave representing '1', followed immediately by 10 half-waves representing bits, here LSB last. In this example, the first bit indicates the state of the switch—on or off, the next four bits indicate the address of the switch, and the next 6 bits indicate the address of the switch unit.

Since all the switch units transfer information on the same line, protection against clashes of messages must be provided. In order to prevent corruption of messages, each switch controller includes a voltage sensor 89 on its return line. The switch controller 80 transfers its message, after checking the return line and finding at least 10 pulses with no transmission. During its own transmission, the switch controller checks the output voltage level, and compares it to what the switch controller intended to transfer. If the controller discovers '1' when it intended to disconnect the line in order to transfer '0', it knows that another switch controller is transferring information in parallel to it. In this case, the switch controller would stop the transmission immediately, would count another 10 empty pulses, and retransfer its message.

The central controller samples the return switch line continuously at predefined intervals, for example at 100 microsecond intervals, and identifies messages from the switch units. When a message from a switch unit is received indicating a change in the state of one of the switches, the central controller processes the message to determine which switch has changed, and scans the connections table from start to end to find entries of this switch so as to determine to which load that switch is connected. Once the central controller has determined which load is concerned, it determines which operation is required, i.e., what is the desired state of the load. The central controller then consults the loads table to find the present state of the load. If the present state is the desired state, the controller does nothing. If the present state is not the desired state, the central controller sends a message to the load controller indicating the change required to the new state, and updates the loads table. After that transmission, the central controller continues searching the connections table in order to find other loads to be operated by the same switch.

In addition, the central controller routinely samples the clock at pre-selected time intervals, such as at one second intervals. The central controller scans the timing table from start to end and compares the current time reading to requirements in the timing table. When the central controller identifies equality between the clock and one or more of the time values in the timing table, it updates the timing table and sends an appropriate command (e.g., an on, off or dimming command) to the load or loads whose number is shown in that entry. After the command's transmission, the central controller continues to scan the table to find other loads to be activated at the same time.

Updating of the timing table takes place every time that the system operator or the central controller adds or cancels a connection between a certain time and a certain load. The central controller saves the beginning of table address and the last timing connection address. When a new timing connection is introduced, the central controller adds it at the end of the table, and advances the end of table pointer. When a timing connection is canceled, the central controller deletes this connection from the table, copies the last connection in the table to the place of the deleted connection, and modifies the end of table pointer accordingly. It is important that the end of table address be written in non-volatile memory, to prevent loss during unexpected power loss.

The central controller refers to the connections table in order to update and operate the loads. Updating of the table is done every time the system operator or user adds or cancels a connection between a certain switch and a certain load The controller saves the initial address of the table and the last connection address. When a new connection is introduced, the controller adds it to the end of the table, and advances the pointer of the table's end. When the operator cancels a connection, the controller deletes this connection from the table, copies the last connection in the table to the place of the deleted connection, and decreases the table end pointer. It is important that this pointer is also written in the non-volatile memory, so that the table will be usable after current interruption.

The load handling process is activated at the time of initialization, when a message for a change of state of a switch is received, or when the timer reaches a time at which a load is to be activated. In the case of change of the state of a switch, the controller reads from the connections table which loads are to be changed as a result of the changed switch state, and sends appropriate messages along the appropriate load lines. In case of a change due to the time, the controller reads from the timing table on which loads an operation is to be carried out when a specific time has been reached, and sends an appropriate message along the appropriate load lines. After sending instructions to each load, the controller updates the new load state in the loads table. When the power is first turned on, the central controller sends activation commands to each of the loads according to their states just before the power off, as saved in the loads table.

When a load controller receives a message from the central controller concerning a change of state, the load controller reads the message to determine whether that load controller is the intended address. If so, it determines what state is now required. If that state is the present state of the load, the load controller changes nothing. If not, the load controller actuates a switch to permit current flow, reduce current flow, or cease current flow, as required.

According to one embodiment of the invention, the central controller can also be actuated over a telephone line, as by means of a telephone keypad, or via a modem. In this way, it is possible to input additional commands to the central controller from outside the house or facility, for example, to turn on or off lights, an oven, or a water heater.

Referring now to FIG. 7, there is shown a schematic illustration of a communication system constructed and operative in accordance with another embodiment of the present invention illustrating communication over an electric power line between a transmitter and a receiver, wherein each of the transmitter and receiver can be a switch, a load, or a controller. In the illustrated embodiment, there is shown a switch 108 (which includes both a transmitter and a receiver) and an electrical device or load 112 (which also includes both a transmitter and a receiver). This communication system is substantially similar to that shown in FIG. 1, with the addition of a return line switch 119, permitting transfer of information in both directions, from switch 108 to load 112 and from load 112 to switch 108.

Thus, switch 108 includes a switch controller 114 capable of modifying the shape of the mains electric power wave conducted to load 112, by means of a triac, or other power electrical switch 110. Thus, a change in the state of switch 108 is sensed by switch controller 114, which can modify the shape of the mains electric power wave conducted to load 112 in accordance with an indicated change in state. The methods of modifying the shape of the wave for this embodiment are the same as described above, i.e., cutting a portion of a wave (briefly interrupting the current flow along a line through which current normally flows), and providing a pulse on a line normally without current flow. Load 112 includes a load controller 116, coupled via the power line 118 to electrical switch 110. Load controller 116 identifies any messages sent over the power line 118, and reads the messages in order to determine if or how to change the state of load 112, as by means of a triac 117. In addition, according to this embodiment, load controller 116 can also control a triac, or other power electrical switch 119 which is coupled via a return line 120 to switch controller 114, for messages sent back from load 112 to switch 108.

Referring now to FIG. 7a, there is shown a schematic illustration of a communication system constructed and operative in accordance with yet another embodiment of the present invention, also illustrating communication over an electric power line between a transmitter and a receiver, wherein each of the transmitter and receiver can be a switch, a load, or a controller. In the embodiment of FIG. 7a, there is shown a switch 108 (which includes both a transmitter and a receiver) including a switch controller 114, and an electrical device or load 112 (which also includes both a transmitter and a receiver). It is a particular feature of this embodiment, unlike that of FIG. 7, that this communication system includes a return line 120, over which information is transferred in both directions, from switch 108 to load 112 and from load 112 to switch 108.

Load 112 includes a load controller 116 connected directly the electric source. Load controller 116 identifies any messages sent over the return line 120, and reads the messages in order to determine if or how to change the state of load 112, as by means of a triac 117. In addition, according to this embodiment, load controller 116 can also control a triac, or other power electrical switch 119, which is coupled via return line 120 to switch controller 114.

In this embodiment, there is no change in the main power line. Rather, to enable transmission from both directions, the preferred method of communication is providing a pulse on a line normally without current flow. Thus, switches 119 and 110 pass half waves, which represent command messages, from the main power line to the return line.

Receiving messages is accomplished by sensing the return line 120 by both sides. In other words, the load, the switch and the controller are connected directly to the main power line but do not modify its shape. All the communication is performed on the fourth line (the return line).

It will be appreciated that there can be more than one load and one switch according to this embodiment. For example, there may be 15 switches, 10 loads and two controllers—all communicating through a single return line 120 (the fourth line).

Operation of these embodiments by means of switch 108 is identical to that described above regarding switch 8 in FIG. 1. In addition, in the embodiments of FIGS. 7 and 7a, the load controller 116 can send information about its state back to switch controller 114. Thus, a dialog is possible, instead of the one way communication of the system of FIG. 1. When load controller 116 senses a change in load 112 which was not directed by load controller 114, i.e., a short circuit or overload, load controller 116 activates electronic power switch 119 to modify the electric power wave conducted along return line 120 so as to include a message regarding the desired change of state. The modified wave is received by switch controller 114, which identifies the fact that the wave has been modified. The switch controller 114 then decodes the message in the modified wave, and registers the change of state in load 112. In addition the switch controller 114 can then, change the state of the load 112 by sending another command to the load controller 116 via the power line 118 (FIG. 7) or via the return line 120 (FIG. 7a).

The load controller also communicates with the switch controller at the time of initialization, when the load tells the switch what is its number, as well as in the case where the load has a sensor, as described with regard to a temperature switch. In this case, the load informs the switch controller when it reaches a preset level, or when the sensor senses a selected condition.

Referring now to FIG. 8, there is shown a schematic illustration of a communication system constructed and operative in accordance with FIGS. 7 and 7a, for controlling a plurality of loads. The system of this embodiment is substantially similar to that shown in FIG. 2, with the exception that the connections are by means of a four wire cable instead of a three wire cable. This permits the addition of a return line between the load units and the switches units so as to permit two way transfer of information.

In particular, the system of FIG. 8 includes a central controller 150, a plurality of switch units 152 coupled to an inlet port of the central controller 150, and a plurality of load units 154, here illustrated as lamp units, although the loads can be any other electrical device, as discussed hereinabove. In the embodiment of FIG. 8, all the switch units 152 are connected to the central controller 150 via a single four wire cable 145, i.e., phase, zero, ground and return phase (also called "return"). Switch units 152 are connected to central controller 150 in parallel, or in any other form of connection, including, but not limited to, star, parallel or in line. There is no limit to the number of units or switches.

Load units 154 are connected to an output of central controller 150 in parallel by a four wire cable 145, namely phase, zero, ground and return. Alternatively, the load units can be connected to the central controller in any other form of connection.

Operation of this embodiment is substantially identical to that of FIG. 2, with the addition of the possibility of transfer of information from load units 154 to central controller 150. Thus, central controller 150 receives messages from the switch units 152 over the return line in power line 145, and modifies the electric power wave as required to send command messages to load units 154. The central controller 150 can also send messages to the load units 154 over the return line (as described in FIG. 7a). The central controller 150 can also receive messages from load units 154 regarding their state, in the event of an unexpected change in the state of a particular load, for example, as a result of a short circuit or overload.

The central controller 150 of this embodiment is substantially identical to that described above in FIG. 3, except that the switches return line is a part of a four line cable, instead of a three line cable, so will not be described again.

Figure 9:
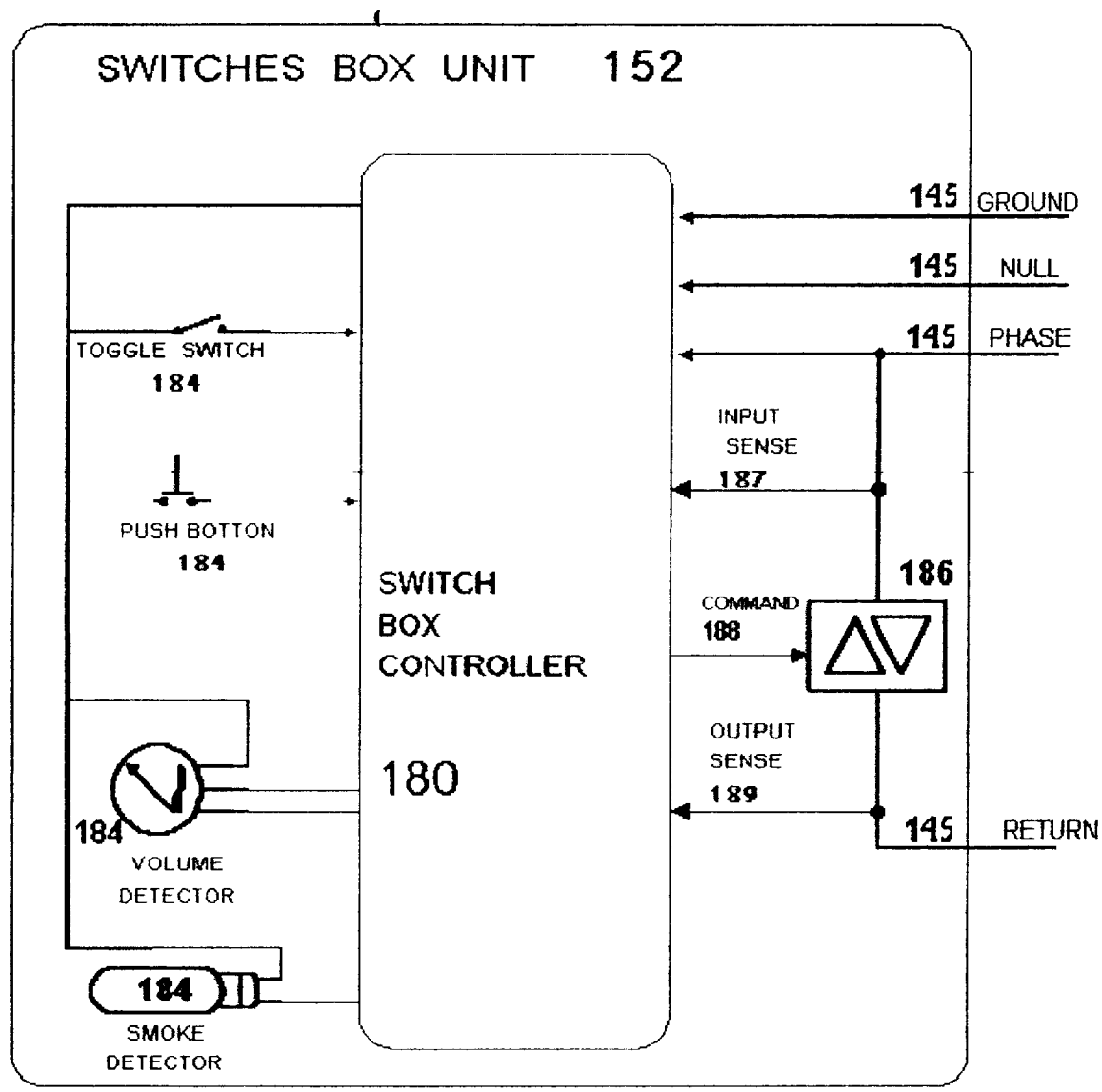
FIG. 9 is a detailed schematic illustration of a switch unit in the system of FIG. 8.

FIG. 9 is a detailed schematic illustration of a switch unit 152 in the system of FIG. 8. Each switch unit 152 includes a switch controller 180 connected to a four wires power line 145 including phase, null, return and ground. At least one switch 184 is coupled to each switch controller 180. Thus, switch controller 180 is substantially identical to and operates in substantially the same fashion as the switch controller in FIG. 4, with the addition of the ground wire, made possible by the use of a four wire cable throughout the system. In addition, by using a four wire cable, the switch controller in this embodiment can also receive messages from the central controller via the phase line or the return line (see the discussion of FIGS. 7 and 7a.) This enables the central controller to set additional parameters in the switch operation, e.g., set a temperature sensor to a desired set point. Then, when the temperature sensor reaches this set point, it acts like a switch by sending back an on or off message.

FIG. 10 is a detailed schematic illustration of a load unit 154 in the system of FIG. 8. Each load unit 154 includes a load controller 190 connected to the four-wire load line 155. As described above with relation to FIG. 5, load controller 190 checks the power line, and looks for messages destined for that load unit. An additional triac 200, or other electronic power switching means, is coupled between the load controller 190 and the return line 202 in the four wire power line 155. Triac 200 is also coupled to the incoming phase line. As in FIG. 5, input sensor 197 senses the input to load controller 190, and a command line 198 sends commands from load controller 190 to triac 194 to change the state of the load 196. Unlike the embodiment of FIG. 5, the load unit 154 can send messages via a return command line 204 and triac 200 over return line 202 to the central controller unit 150 in the event that the load changes state without explicit instructions from the central controller unit, or in any other case, i.e., in the system initialization sequence.

It will be understood that the described embodiments of the invention are illustrative only, and that many other embodiments, variations and applications of the invention, or the several features thereof disclosed, may be made without departing from the spirit or scope of the invention as defined in the following claims.

What is claimed is:

1. A method for generating and transferring digitally a encoded control messages between a switch and an associated load coupled by an electric conductor power line, the method comprising:

modifying at least a portion of the shape of an electric power wave supplied on the electric conductor to correspond to a digitally encoded control message, while permitting continued normal operation of the load; and decoding said control message supplied in the modified electric power wave; wherein said modifying includes providing half waves of said electrical power over a conductor whose normal state is zero voltage.

2. The method according to claim 1, wherein the step of modifying the shape of an electric wave includes cutting at least a portion of the electric power wave supplied to the load.

3. The method according to claim 1, wherein the step of modifying the shape of an electric wave includes cutting at least one complete half-wave of the electric power wave supplied to the load.

4. The method according to claim 1, including transferring control messages to two or more loads simultaneously, by modifying at least a portion of the shape of an electric power wave supplied on the electric conductor.

5. The method according to claim 1, further including the steps of performing instructions carried in said control message.

6. The method according to claim 1, further including the steps of:

coupling a load controller between the conductor and the load;

receiving said control messages in the load controller; and activating the load in accordance with information in said control messages.

7. The method according to claim 6, further including the steps of:

sending a message from said load controller to the switch by providing pulses of electric voltage over a conductor whose normal state is zero voltage.

8. The method according to claim 1, further including the steps of:

coupling a central controller between thee switch and the load controller;

receiving control messages indicating a change of state from the switch in the central controller; and supplying control messages by modifying at least a portion of an electric power wave over the electric conductor to said load controller, in accordance with said messages indicating a change of state.

9. The method according to claim 8, wherein said switch controller supplies said control messages indicating a change of state by modifying an electric power wave on the electric conductor power line by providing pulses of electric voltage over a conductor whose normal state is zero voltage.

10. The method according to claim 8, including generating and transferring control messages between selected ones of a plurality of loads and at least one associated switch, by modifying at least a portion of the shape of an electric power wave supplied on the electric conductor.

11. Apparatus for transferring digitally encoded control messages between a transmitter and a receiver, where transmitter and receiver can each be switch, load or controller coupled to an electric conductor power line, the apparatus comprising:
   a controller for modifying an electric power wave supplied on an electrical conductor of the electric conductor power line to correspond to a digitally encoded control message while permitting continued normal operation of the load; and
   a controller for decoding said control message supplied in the modified electric power wave;
      wherein said controller for modifying includes means for providing half waves of said electrical power over a conductor whose normal state is zero voltage.

12. The apparatus according to claim 11, wherein said means for modifying includes means for providing a pulse on an electric conductor with normally zero voltage.

13. The apparatus according to claim 11, wherein said means for modifying includes means for cutting at least a portion of the electric power wave.

14. The apparatus according to claim 11, wherein said load includes a plurality of loads arranged for selective operation.

15. The apparatus according to claim 11, further comprising:
   a switch and switch controller coupled to the load by an electric conductor power line;
   said switch controller being arranged to modify an electric power wave supplied over said electric conductor power line to correspond to a control message;
   a load controller coupled between said switch controller and the load by an electrical conductor of an electric power line;
   said load controller being arranged to receive said modified electric power wave and to activate said load in accordance with messages supplied thereon.

16. The apparatus according to claim 15, further comprising:
   a central controller coupled between said switch controller and said load controller by an electrical conductor of an electric power line;
   said central controller being arranged to receive said modified electric power wave from said switch controller and read said!messages supplied thereon; and
   said central controller being arranged to modify an electric power wave supplied over said electric conductor power line to include command messages to said load controller.

17. The apparatus according to claim 16, wherein said central controller includes:
   a transmitter for modifying an electric power wave supplied over an electrical conductor in an electric power line so that said electric power wave carries command messages.

18. The apparatus according to claim 17, wherein said central controller further includes:
   a receiver for receiving a modified electric power wave carrying command messages from a second transmitter; and
   a processor for reading messages from said modified electric power wave from said second transmitter.

19. The apparatus according to claim 16, wherein said central controller further comprises:
   a loads table, including an address associated with each load, and an entry corresponding to a state of said load.

20. The apparatus according to claim 16, wherein said central controller further comprises:
   a connections table, indicating connections between a plurality of switches and a plurality of loads to be activated by said switches.

21. The apparatus according to claim 16, wherein said central controller further comprises:
   a clock; and
   a timing table indicating connections between a plurality of times and a plurality of loads, and operations to be performed on said loads at said times.

22. The apparatus according to claim 11, wherein said controller includes an electronic power switch for modifying said electric power wave.

23. The apparatus according to claim 11, wherein said controller includes a triac for modifying said electric power wave.

24. An electrical circuit comprising:
   (a) at least two transceivers; and
   (b) a four wire cable including:
      (i) a phase wire,
      (ii) a null wire, and
      (iii) a ground wire, said phase wire, said null wire and said ground wire being for providing an electrical power wave to said transceivers, and
      (iv) a return line, said transceivers communicating with each other by exchanging half waves of said electrical power via said return line, electrical current on said return line being only said half waves.

25. The electrical circuit of claim 24, wherein at least one of said transceivers is a switch unit.

26. The electrical circuit of claim 24, wherein at least one of said transceivers is a load unit.

27. The electrical circuit of claim 24, wherein at least one of said transceivers is a central controller.

28. The electrical circuit of claim 24, wherein said communicating is only via said return line.

* * * * *